(12) United States Patent
Islam et al.

(10) Patent No.: US 11,057,938 B2
(45) Date of Patent: Jul. 6, 2021

(54) WIRELESS COMMUNICATION INCLUDING RANDOM ACCESS

(71) Applicant: QUALCOMM Incorporated, San Diego, CA (US)

(72) Inventors: Muhammad Nazmul Islam, Littleton, MA (US); Linhai He, San Diego, CA (US); Bilal Sadiq, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/270,476

(22) Filed: Feb. 7, 2019

(65) Prior Publication Data

US 2019/0364599 A1 Nov. 28, 2019

Related U.S. Application Data

(60) Provisional application No. 62/675,629, filed on May 23, 2018.

(51) Int. Cl.
*H04W 74/08* (2009.01)
*H04W 74/00* (2009.01)

(52) U.S. Cl.
CPC ..... *H04W 74/0833* (2013.01); *H04W 74/006* (2013.01)

(58) Field of Classification Search
CPC ........... H04W 74/0833; H04W 74/006; H04W 74/0891; H04W 56/0005; H04W 56/001
See application file for complete search history.

(56) References Cited

U.S. PATENT DOCUMENTS

2019/0037605 A1* 1/2019 Agiwal ................. H04L 5/0048
2019/0081753 A1* 3/2019 Jung .................... H04B 7/0617
(Continued)

OTHER PUBLICATIONS

Huawei et al., "Discussion on BFR-config for SCell BFR", 3GPP Draft; R2-1807961 Discussion on BFR-CONFIG for SCell-BFR, 3rd Generation Partnership Project (3GPP), Mobile Competence Centre ; 650, Route Des Lucioles ; F-06921 Sophia-Antipolis Cedex ; France, vol. RAN WG2, No. Busan, Korea; May 21, 2018-May 25, 2018, May 20, 2018 (May 20, 2018), XP051444286, 7 pages, Retrieved from the Internet: URL:http://www.3gpp.org/ftp/Meetings%5F3GPP%5FSYNC/RAN2/Docs/ [retrieved on May 20, 2018], Section 2, p. 2.
(Continued)

*Primary Examiner* — Candal Elpenord
(74) *Attorney, Agent, or Firm* — Arent Fox, LLP

(57) ABSTRACT

A method, a computer-readable medium, and an apparatus are provided for wireless communication that enables a UE to generate a PRACH message based on an SSB/CSI-RS for a first cell or first band and to transmit the PRACH message via another cell or another band. Aspects enable a base station to select an SSB index for transmitting downlink communication to the UE on the first cell/first band. A UE receives an SSB/CSI-RS from a base station through a first cell and transmits a random access message for the SSB/CSI-RS to the base station through a second cell. In another aspect the UE receives the SSB/CSI-RS from a base station through a first frequency range and transmits a random access message based on the SSB/CSI-RS to the base station through a second frequency range.

46 Claims, 14 Drawing Sheets

(56) References Cited

U.S. PATENT DOCUMENTS

| | | | |
|---|---|---|---|
| 2019/0159261 A1* | 5/2019 | Jung | H04W 74/0833 |
| 2019/0190582 A1* | 6/2019 | Guo | H04B 7/088 |
| 2019/0215706 A1* | 7/2019 | Tsai | H04W 72/042 |
| 2019/0274098 A1* | 9/2019 | Cheng | H04L 5/0025 |
| 2019/0306765 A1* | 10/2019 | Cirik | H04W 36/0079 |
| 2020/0068463 A1* | 2/2020 | Da Silva | H04L 1/0026 |

OTHER PUBLICATIONS

Huawei et al., "Overview of NR UL for LTE-NR Coexistence", 3GPP Draft; R1-1709979, 3rd Generation Partnership Project (3GPP), Mobile Competence Centre ; 650, Route Des Lucioles ; F-06921 Sophia-Antipolis Cedex; France, vol. RAN WG1, No. Qingdao, China, Jun. 27, 2017-Jun. 30, 2017, Jun. 17, 2017 (Jun. 17, 2017), XP051304719, Retrieved from the Internet:URL:http://www.3gpp.org/ftp/tsg_ran/WG1_RL1/TSGR1_AH/NR_AH_1706/Docs/, 12 pages, Sections 2.1, 2.2.4.1; pp. 2,6.

International Search Report and Written Opinion—PCT/US2019/032257—ISA/EPO—dated Jul. 3, 2019.

ZTE et al., "Remaining Details of RACH Procedure", 3GPP Draft; R1-1719346, 3rd Generation Partnership Project (3GPP), Mobile Competence Centre ; 650, Route Des Lucioles ; F-06921 Sophia-Antipolis Cedex; France, vol. RAN WG1, No. Reno, USA; Nov. 27, 2017-Dec. 1, 2017, Nov. 18, 2017 (Nov. 18, 2017), XP051369275, 30 Pages, Retrieved from the Internet: URL:http://www.3gpp.org/ftp/tsg%5Fran/WG1%5FRL1/TSGR1%5F91/Docs/ [retrieved on Nov. 18, 2017], Figures 1-14, Sections 2-10, Section 8, Sections 7.2-7.5, 7.8-7.11; p. 7-p. 18.

* cited by examiner

WIRELESS COMMUNICATION INCLUDING RANDOM ACCESS

CROSS-REFERENCE TO RELATED APPLICATION(S)

This application claims the benefit of U.S. Provisional Application Ser. No. 62/675,629, entitled "Wireless Communication Including Random Access" and filed on May 23, 2018, which is expressly incorporated by reference herein in its entirety.

BACKGROUND

Technical Field

The present disclosure relates generally to communication systems, and more particularly, to random access in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A network may configure a set of time and frequency resources as RACH occasions, in time and frequency, and Random Access Channel (RACH) preamble indices. A mapping between an Synchronization Signal Block (SSB) or Channel State Information Reference Signal (CSI-RS) and the RACH occasions and preamble indices enable the UE to select an appropriate RACH occasion and preamble index from the set in order to convey a particular SSB index/CSI-RS to the network. The base station may respond to receipt of a RACH preamble, e.g., Msg 1, from the UE with downlink communication based on the indicated SSB index/CSI-RS. For example, the base station may transmit a RACH response message, e.g., Msg 2, based on the indicated SSB index. In certain circumstances, UE may be able to receive downlink communication on a first cell or a first band, but limited from transmitting uplink communication via the first cell/first band. For example, in supplementary downlink operation, a UE may be able to receive downlink signals yet be unable to transmit an uplink signal. In another example, a UE might not be able to transmit an uplink signal using a particular frequency band, e.g. Frequency Range 2 (FR2), due to restrictive limits on uplink transmit power and/or poor link quality. A base station may still need to determine an SSB index to use to transmit the downlink communication to the UE via the first cell/first band. Aspects enable a base station to select an SSB index for transmitting downlink communication to the UE via the first cell.

Aspects are presented herein that enable a UE to generate a Physical Random Access Channel (PRACH) message based on an SSB/CSI-RS for a first cell or first band and to transmit the PRACH message via another cell or another band. Aspects enable a base station to select an SSB index for transmitting downlink communication to the UE on the first cell/first band based on a RACH preamble received via the second cell/second band.

In an aspect of the disclosure, a method, a computer-readable medium, and an apparatus are provided for wireless communication at a User Equipment (UE). The apparatus receives at least one of a Synchronization Signal Block (SSB) or a Channel State Information Reference Signal (CSI-RS) from a base station through a first cell and transmits a random access message to the base station based on the SSB/CSI-RS through a second cell.

In another aspect of the disclosure, a method, a computer-readable medium, and an apparatus are provided for wireless communication at a UE. The apparatus receives at least one of an SSB or a CSI-RS from a base station through a first frequency range and transmits a random access message based on the SSB/CSI-RS to the base station through a second frequency range.

In another aspect of the disclosure, a method, a computer-readable medium, and an apparatus are provided for wireless communication at a base station. The apparatus transmits at least one of an SSB or a CSI-RS through a first cell and receives a random access message from a UE for the SSB/CSI-RS through a second cell.

In another aspect of the disclosure, a method, a computer-readable medium, and an apparatus are provided for wireless communication at a base station. The apparatus transmits at least one of an SSB or a CSI-RS on a first frequency range and receives a random access message from a UE for the SSB/CSI-RS on a second frequency range.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
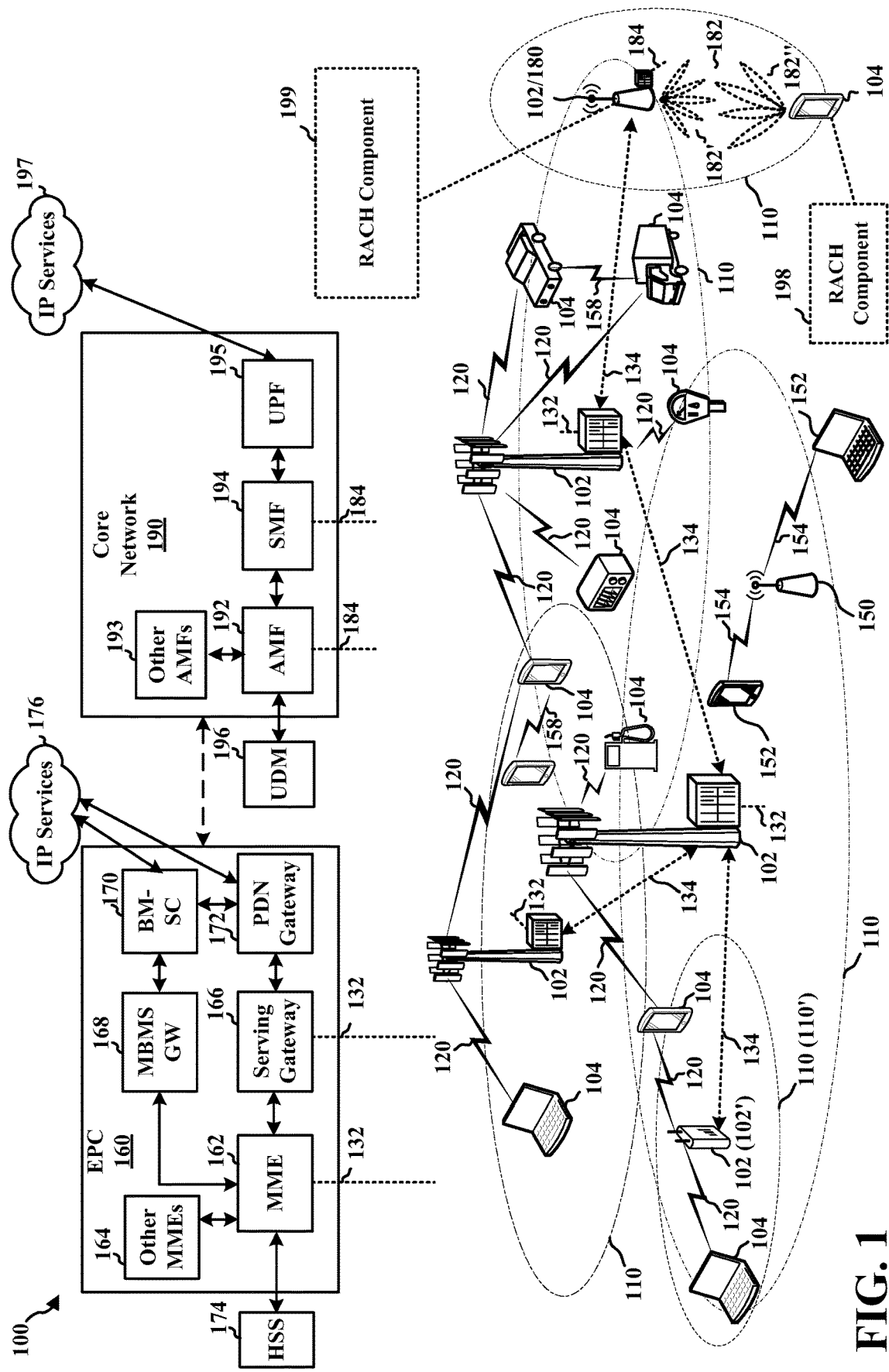
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) may include base stations 102, UEs 104, an Evolved Packet Core (EPC) 160, and/or another core network 190, such as a 5G Core (5GC). The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise a RACH component 198 configured to receive SSB/CSI-RS on a first cell/first frequency band and to transmit a RACH Msg 1 for the SSB/CSI-RS on a second cell/second frequency band. Similarly, the base station 180 may comprise a RACH component 199 configured to transmit SSB/CSI-RS on a first cell/first frequency band and to receive a RACH Msg 1 for the SSB/CSI-RS on a second cell/second frequency band.

Figure 2:
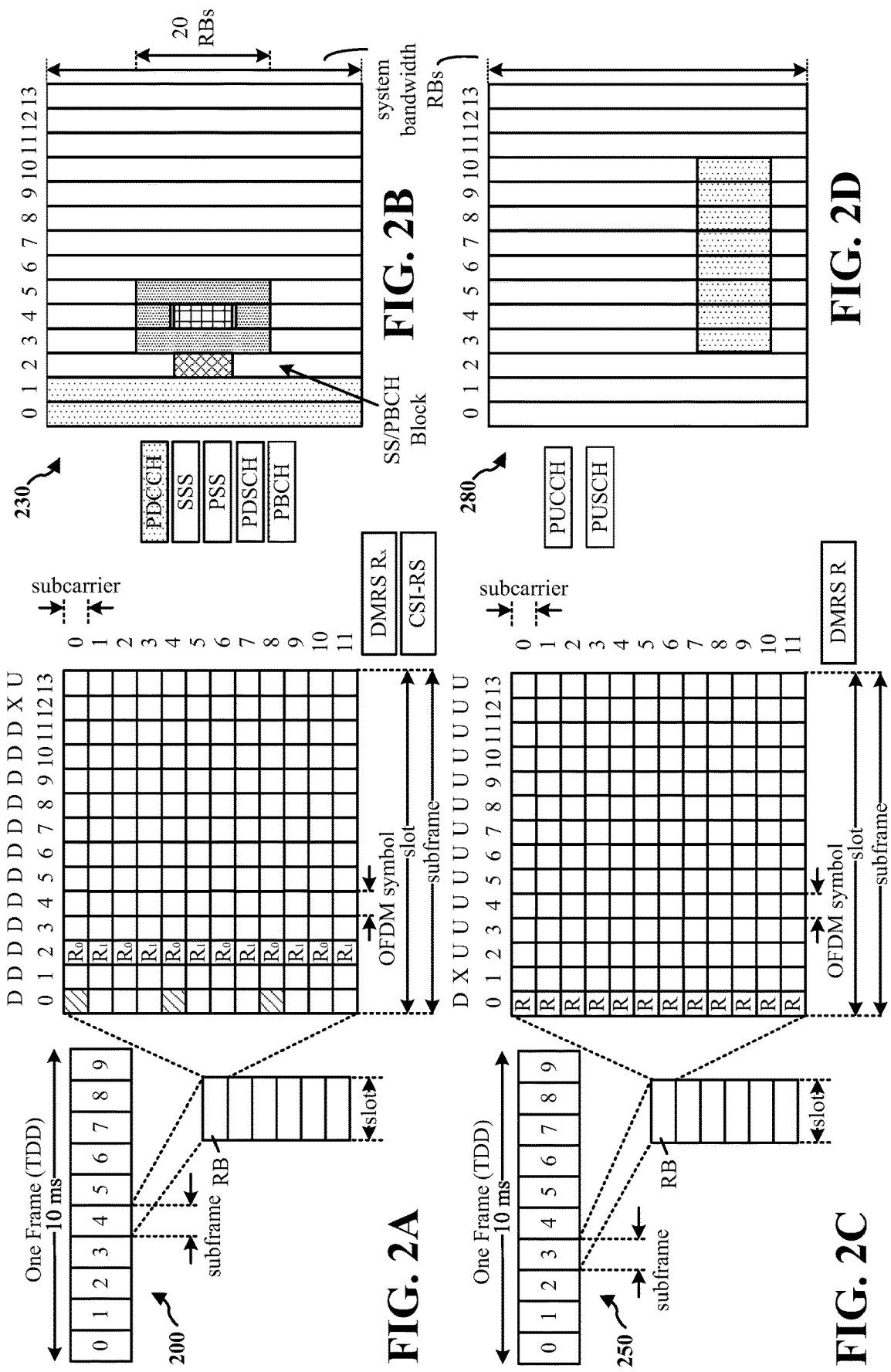
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within an example 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
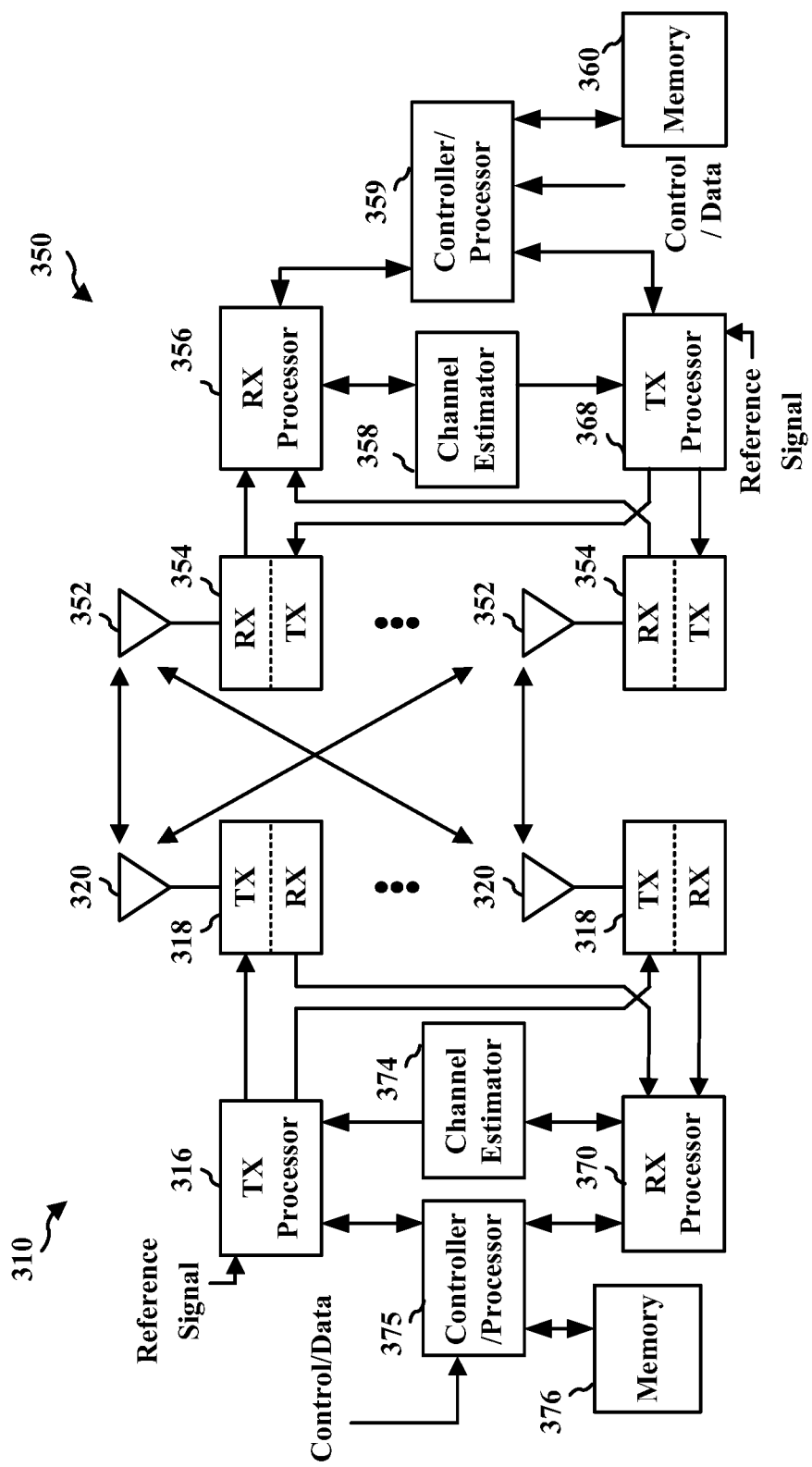
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
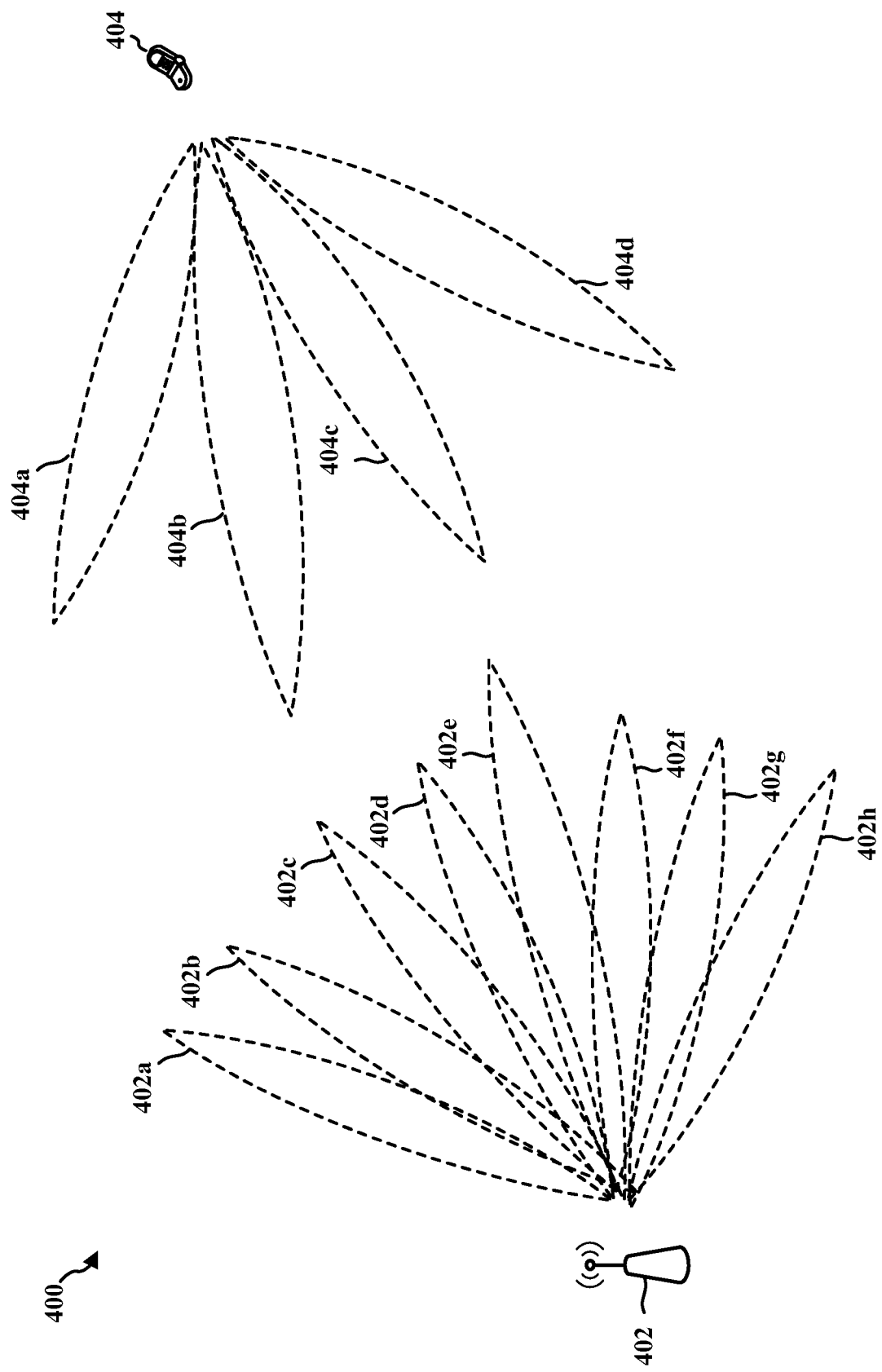
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

A network may configure a set of time and frequency resources as RACH occasions, in time and frequency, and RACH preamble indices. A mapping between an SSB or Channel State Information Reference Signal (CSI-RS) and the RACH occasions and preamble indices enable the UE to select an appropriate RACH occasion and preamble index from the set of time and frequency resources in order to convey a particular SSB index/CSI-RS to the network. The base station may respond to receipt of a RACH preamble, e.g., Msg 1, with downlink communication based on the indicated SSB index/CSI-RS. For example, the base station may transmit a RACH response message, e.g., Msg 2, based on the indicated SSB index.

In certain circumstances, UE may be able to receive downlink communication on a first cell or a first band, but may be limited from transmitting uplink communication via the first cell/first band. For example, in supplemental downlink operation, a UE may be able to receive downlink signals yet be unable to transmit an uplink signal. For example, in supplemental downlink operation, certain frequency bands may be used for downlink transmissions without any uplink transmissions. Limitations on uplink communication may also arise in mmW communication. Communication in mmW systems may be directional, as described in connection with FIG. 4. The use of directional beams may lead to limitation on the transmission of uplink signals, as compared to omni-directional signals (i.e, which are transmitted in all directions). Such limitations may restrict uplink signals from certain bands. For example, a UE might not be able to transmit an uplink signal using Frequency Range 2 (FR2), due to restrictive limits on uplink transmit power to satisfy maximum permissible exposure (MPE) restrictions and/or due to poor link quality.

While the UE is limited from transmitting an uplink signal via the cell/band, the base station may still need to determine an SSB index to use to transmit downlink communication to the UE via the first cell/band. Aspects presented herein provide solutions in which a UE may send a RACH preamble message via another cell/band that enables the base station to select an SSB index for transmitting the downlink communication to the UE via the cell/band with the uplink limitation.

As presented herein, a UE may receive a signal, such as an Synchronization Signal Block (SSB), CSI-RS, etc., on a first cell or a first band. The UE may send a message on a second cell or a second band regarding the signal received on the first cell or first band. Reporting regarding an SSB or CSI-RS on a first cell/first band by transmitting the report on a second cell or second band may be helpful for supplemental downlink operation, mmW communication, etc.

The first cell with a limitation on uplink transmission may be a secondary cell and the second cell on which the RACH message is transmitted may be a primary secondary cell. In another example, the first band may comprise a Frequency Range 2 (FR2) band that is over GHz band, and the second band may comprise a Frequency Range 1 (FR1) band (sub-6 GHz band). A UE might not be able to transmit uplink communication through FR2 because uplink transmit power might be very limited, e.g., to satisfy maximum permissible exposure (MPE) restrictions, and/or uplink link quality might be poor. Thus, the UE may receive SSB/CSI-RS through FR2 and may convey RACH information regarding the SSB/CSI-RS received through FR2 by transmitting the RACH information on FR1.

Thus, aspects presented herein describe the manner in which a UE can convey, to the network, an SSB index of a cell or a band by transmitting RACH information on another cell/band.

For contention free random access (CFRA), a network configures a set of dedicated time-frequency RACH occasions and preamble indices corresponding to a subset of SSBs or CSI-RS. The network may also configure a threshold for selecting SSB/CSI-RS to perform CFRA. The network provides the combination of a dedicated set of RACH occasions (time and frequency resource) and preamble indices per SSB and/or per CSI-RS to the UE. Thus, the network provides a set of SSBs, each having a corresponding RACH time/frequency location and RACH preamble index. For contention based random access, the network configures an Reference Signal Received Power (RSRP) threshold for selecting an SSB. The UE measures the RSRP of all detected SSBs/CSI-RS. If there are multiple SSBs/CSI-RS configured for CFRA that have RSRP measurements meeting the threshold, the UE can flexibly select one of the multiple SSBs for CFRA preamble transmission. If there is no SSB/CSI-RS that is configured for CFRA and having an RSRP over the threshold, the UE can select any SSB/CSI-RS.

For contention free random access during handover, the UE measures the RSRP of different SSBs and reports the measurements to the network.

After selecting one SSB or CSI-RS, the UE uses the corresponding dedicated RACH occasion and preamble index for the selected SSB/CSI-RS to transmit a RACH preamble, e.g., Msg1, to the network using a time and frequency resource and preamble index corresponding to the selected SSB/CSI-RS. As the configured resources are dedicated for a particular SSB/CSI-RS, the network is able to identify which UE transmitted the RACH preamble and may respond by transmitting a random access response, e.g., Msg2, to the UE through the selected SSB index.

RACH parameters for CFRA resources may be based, e.g., on a dedicated configuration such as a RACH configuration Information Element (IE) (e.g., RACH-ConfigDedicated IE). The IE may provide information about resources configured for Msg1, e.g., based on a System Information (SI) request. The RACH configuration information may indicate CFRA resources in time and frequency. The RACH configuration information may indicated CFRA occasions based on RACH resources configured for CFRA and based on an SSB per RACH occasion. CFRA resources may be indicated using an SSB resource list with a corresponding RACH occasion index. A RACH preamble index may also be indicated for each of the list of SSBs. An RSRP threshold may be indicated for selection of the SSB for CFRA. The network may configure the RSRP threshold for use by the UE in selecting SSB for performing CFRA. The UE may measure the RSRP of all detected SSBs, and may determine whether any of the SSBs meet the configured RSRP threshold. If the RSRP for an SSB meets the RSRP threshold, the UE may select the SSB for use in determining a preamble transmission for CFRA. Similar information may be provided for CSI-RS configured for CFRA, e.g., including RACH occasion indexes, RACH preamble indexes, and/or RSRP threshold information for a set of CSI-RS configured for CFRA.

As described, CFRA SSB resources may provide one RACH preamble index and one RACH time/frequency index for each corresponding SSB/CSI-RS. This configuration of the RACH preamble indices and time/frequency resources for RACH corresponding to different SSBs/CSI-RSs may be indicated by the base station to the UE. In order to transmit a RACH based on a received SSB/CSI-RS, the UE selects the corresponding RACH preamble index and one RACH time/frequency resource indicated in the configuration received from the base station. This enable the base station to identify the SSB/CSI-RS based on the RACH preamble index and time/frequency resource(s) of the received RACH.

Parameters in the configuration from the base station may include any of those indicated in Tables 1-5. The example names in Tables 1-5 are merely examples, and parameter providing such information may also be referred to by other names.

TABLE 1

CFRA-CSIRS-Resource field descriptions csi-RS

The ID of a CSI-RS resource defined in the measurement object associated with this serving cell.

ra-OccasionList

RA occasions that the UE shall use when performing CF-RA upon selecting the candidate beam identified by this CSI-RS.

ra-PreambleIndex

The RA preamble index to use in the RA occasions associated with this CSI-RS.

TABLE 2

CFRA-Resources field descriptions ra-ssb-OccasionMaskIndex

Explicitly signaled PRACH Mask Index for RA Resource selection. The mask is valid for all SSB resources signaled in ssb-ResourceList

TABLE 3

CFRA-SSB-Resource field descriptions ra-PreambleIndex

The preamble index that the UE shall use when performing CF-RA upon selecting the candidate beams identified by this SSB.

ssb

The ID of an SSB transmitted by this serving cell.

TABLE 4

RACH-ConfigDedicated field descriptions cfra-Occasions

If the field is absent the UE uses the random access occasions for CBRA cfra-Resources Resources for contention free random access to a given target cell rach-ConfigCFRA Configuration of contention free random access occasions for CFRA ssb-perRACH-Occasion Number of SSBs per RACH occasion (L1 parameter 'SSB-per-rach-occasion')

TABLE 5

| Conditional Presence | Explanation |
|---|---|
| SSB-CFRA | The field may be present if cfra-Resources is used to refer to SSB resources; otherwise it might not be present. |

A UE may use a random access procedure in order to communicate with a base station. For example, the UE may use the random access procedure to request an RRC connection, to re-establish an RRC connection, resume an RRC connection, etc. A four-step RACH procedure 410 includes the exchange of four messages. Specifically, the UE may initiate the message exchange by sending, to the base station, a first RACH message (e.g., Msg 1) including a preamble. The base station responds to the first RACH message by sending a second RACH message (e.g. Msg 2) including a random access response (RAR). Msg 2 may include an identifier of the RACH preamble, a time advance (TA), an uplink grant for the UE to transmit data, cell radio network temporary identifier (C-RNTI), and/or a back-off indicator. Upon receiving the RAR, the UE transmits a third RACH message (e.g., Msg 3) to the base station that may include a RRC connection request, an RRC connection re-establishment request, or an RRC connection resume request, depending on the trigger for the initiating the random access procedure. The base station then completes the four-step RACH procedure by sending a fourth RACH message (e.g., Msg 4). The fourth RACH message may include a RACH response message that includes timing advancement information, contention resolution information, and/or RRC connection setup information.

A two-step RACH procedure may also be used, which has a reduced signaling compared to the four-step RACH. The may initiate the message exchange of the two-step RACH procedure by sending a first RACH message (e.g., Msg 1) to the base station. The first RACH message may comprise a preamble and may also include a payload. In response to receiving the Msg 1, the base station may complete the RACH message exchange by sending a second RACH message (e.g., Msg 2) to the UE. The second RACH message may comprise a RACH response message similar to Msg 4 for the four-step RACH procedure. The UE 502 may be identified using an identifier (ID), such as a radio network temporary identifier (RNTI) (e.g., a random access (RA) RNTI, a temporary RNTI, etc.), which may be used indicated to the base station in the first RACH message. The second RACH message include control information in a PDCCH and data in a PDSCH.

For contention based random access (CBRA), the network may configures a set of RACH occasions, in time-frequency resources, and preamble indices. The network may allow a cyclic mapping from SSBs to the RACH occasions and preamble indices so that a UE can select an SSB and transmit Msg1 by selecting an appropriate RACH occasion and preamble index from the set of corresponding RACH occasions and preamble indices. The UE conveys the SSB index to the network according to the use of time-frequency resources to send a preamble corresponding to the preamble index for a particular SSB. The network responds to the Msg1 by transmitting a Msg2 through the conveyed SSB index. After the completion of four messages of a four-step RACH procedure, the network may identify the UE that transmitted Msg1 and may establish a connected mode of operation with the UE.

Instead of the network providing a mapping between time/frequency resources for each of the SSBs, the SSBs may be cyclically mapped to a group of time/frequency resources. Thus, a UE selects from among the group of time/frequency resources using the cyclical mapping and conveys the message to the network.

Figure 6:
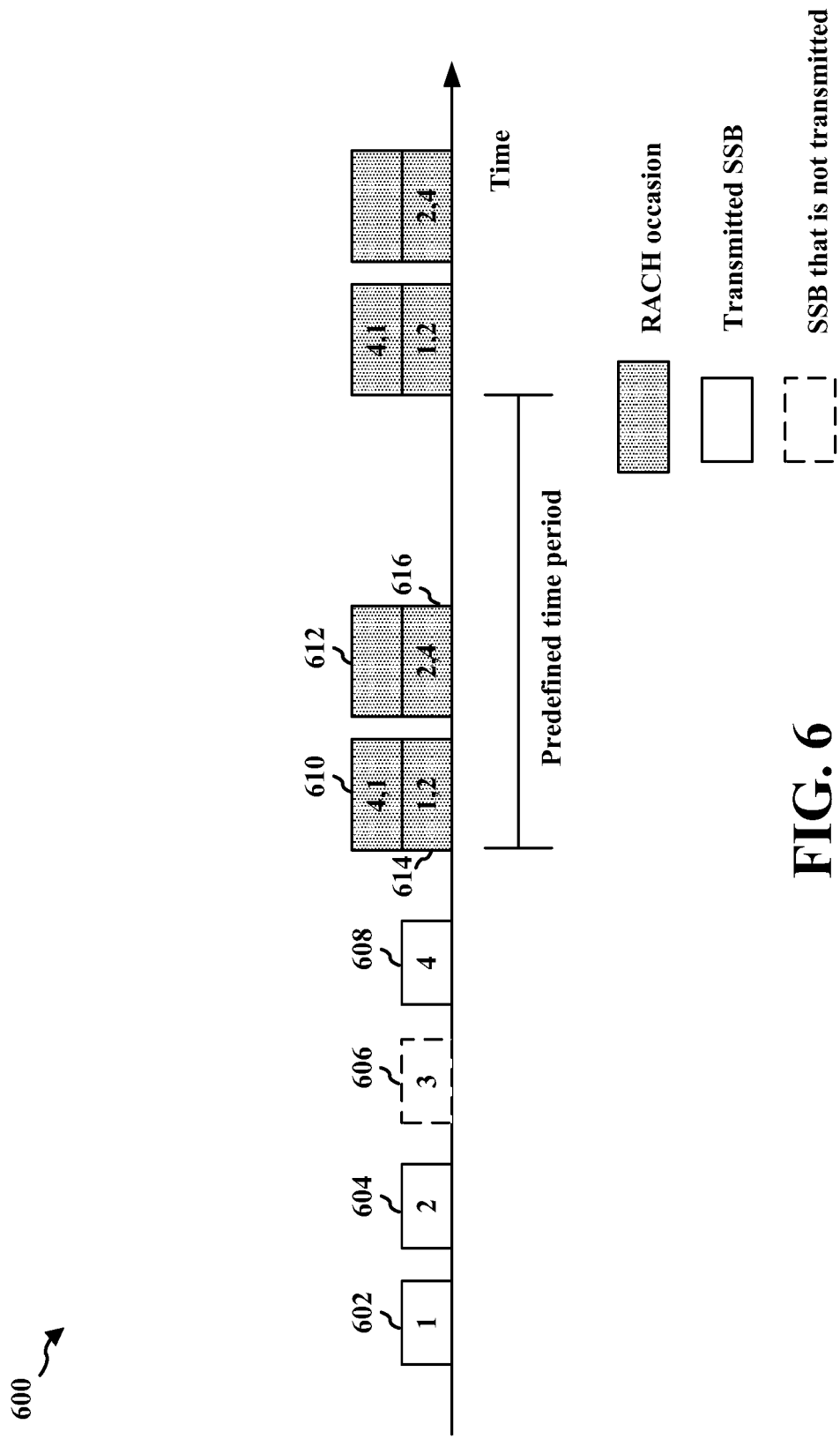
FIG. 6 illustrates an example mapping between SSB/CSI-RS indexes and RACH resources in time and frequency.

FIG. 6 illustrates an example 600 of cyclic mapping of SSBs to RACH occasions. In FIG. 6, three SSBs are transmitted by the base station, e.g., SSB index #1 602, SSB index #1 604, SSB index #4 608. SSB index #3 606 is not transmitted. In mmW, the base station may transmit up to 64 SSBs. In sub-6 GHz, the base station may transmit up to 4. In mmW, the base station has the flexibility to not transmit all of the SSBs. Thus, the base station may transmit SSB1, SSB2, SSB7, SSB8, etc. The set of time frequency resources for RACH are configured that each resource may be mapped to 2 SSBs. RACH resources in time and frequency, e.g., RACH resources 610, 612, 614, may be cyclically mapped to the SSBs. For example, RACH resource 610 may be mapped to SSB index #4 608 and to SSB index #1 602. RACH resource 614 may be mapped to SSB index #1 602 and to SSB index #2 604. RACH resource 616 may be mapped to SSB index #2 604 and to SSB index #4 608, and so forth. After some point, the mapping may be repeated. Thus, for SSB index #4, the UE may transmit RACH in the first half of the preamble resources for 610 or in the second half of the preamble resources for 616.

RACH parameters for CBRA resources may be based on configured RACH parameters such as a RACH configuration common IE (e.g., RACH-ConfigCommon IE). The RACH configuration IE for CBRA may indicate a generic RACH configuration (e.g., RACH-ConfigGeneric) along with a total number of RACH preamble indices. The configuration may provide mapping information that maps SSB to RACH occasions and RACH preambles in a per SSB manner. The mapping information may indicate a cyclical mapping between the SSBs and RACH occasions/RACH preambles. The configuration IE may include additional information including RSRP threshold information for the SSBs.

The RACH parameters may provide a mapping between RACH preambles and SSBs, (e.g., ssb-perRACH-OccasionAndCB-PreamblesPerSSB) that may be included in a portion of the RACH configuration IE.

Parameters in the configuration from the base station may include any of those indicated in Table 6.

TABLE 6

| RACH-ConfigCommon field description |
|---|
| messagePowerOffsetGroupB |
| Threshold for preamble selection. Value in dB. Value minus infinity corresponds to −infinity. Value dB0 corresponds to 0 dB, dB5 corresponds to 5 dB and so on. |
| msg1-SubcarrierSpacing |
| Subcarrier spacing of PRACH. Only the values 15 or 30 kHz (<6 GHz), 60 or 120 kHz (>6 GHz) are applicable. Corresponds to L1 parameter 'prach-Msg1SubcarrierSpacing' |
| msg3-transformPrecoding |
| Indicates to a UE whether transform precoding is enabled for Msg3 transmission. Absence indicates that it is disabled. Corresponds to L1 parameter 'msg3-tp' |

TABLE 6-continued

RACH-ConfigCommon field description numberOfRA-PreamblesGroupA

The number of CB preambles per SSB in group A. This determines implicitly the number of CB preambles per SSB available in group B. The setting should be consistent with the setting of ssb-perRACH-OccasionAndCB-PreamblesPerSSB.
prach-RootSequenceIndex PRACH root sequence index. Corresponds to L1 parameter 'PRACHRootSequenceIndex'. The value range depends on whether L = 839 or L = 139
ra-ContentionResolutionTimer The initial value for the contention resolution timer
ra-Msg3SizeGroupA Transport Blocks size threshold in bit below which the UE shall use a contention based RA preamble of group A.
rach-ConfigGeneric Generic RACH parameters
restrictedSetConfig Configuration of an unrestricted set or one of two types of restricted sets
rsrp-ThresholdSSB UE may select the SS block and corresponding PRACH resource for path-loss estimation and (re)transmission based on SS blocks that satisfy the threshold
rsrp-ThresholdSSB-SUL he UE selects SUL carrier to perform random access based on this threshold
ssb-perRACH-OccasionAndCB-PreamblesPerSSB Number of SSBs per RACH occasion (L1 parameter 'SSB-per-rach-occasion') and the number of Contention Based preambles per SSB (L1 parameter 'CB-preambles-per-SSB'). The total number of CB preambles in a RACH occasion is given by CB-preambles-per-SSB * max(1, SSB-per-rach-occasion).
totalNumberOfRA-Preambles Total number of preambles used for contention based and contention free random access, excluding preambles used for other purposes (e.g. for SI request). If the field is absent, the UE may use all 64 preambles for RA.
SUL This field may be present in initialUplinkBWP in supplementaryUplink; otherwise, the field may be absent.

In another example, generic RACH (e.g., RACH-Config-Generic IE) configuration may be used to specify the cell specific random-access parameters both for regular random access as well as for beam failure recovery. The configuration may indicate RACH resources in time, e.g., using a PRACH configuration index (such as a prach-ConfigurationIndex), as well as frequency resources for the RACH. The frequency resources for the RACH may indicate whether FDM applies for Msg 1 (e.g., msg1-FDM) and/or a starting frequency for Msg 1 (e.g., msg1-FrequencyStart) for the RACH. Such a generic RACH configuration IE may include a generic RACH configuration for RACH and beam failure recovery, including any of a PRACH configuration index, Msg1 FDM information, Msg1 starting frequency information, zero correlation zone configuration information (e.g., zeroCorrelationZoneConfig), a target power for receiving a preamble (e.g., preambleReceivedTargetPower), a transmission maximum for a preamble (e.g., preambleTransMax), power ramping step information, and/or information about a window for receiving a RACH response. Table 7 includes example RACH parameters that may be indicated to a UE in a generic RACH configuration IE (e.g., RACH-ConfigGeneric IE) from a base station.

TABLE 7

RACH-ConfigGeneric field descriptions msg1-FDM

The number of PRACH transmission occasions FDMed in one time instance. Corresponds to L1 parameter 'prach-FDM'
msg1-FrequencyStart Offset of lowest PRACH transmission occasion in frequency domain with respective to PRB 0. The value is configured so that the corresponding RACH resource is entirely within the bandwidth of the UL BWP. Corresponds to L1 parameter 'prach-frequency-start'
powerRampingStep Power ramping steps for PRACH
prach-ConfigurationIndex PRACH configuration index. Corresponds to L1 parameter 'PRACHConfigurationIndex'

TABLE 7-continued

RACH-ConfigGeneric field descriptions preambleReceivedTargetPower

The target power level at the network receiver side. Only multiples of 2 dBm may be chosen (e.g. −200, −198, . . . ).
FFS-Value:
preambleTransMax Max number of RA preamble transmission perfomed before declaring a failure
ra-ResponseWindow Msg2 (RAR) window length in number of slots. The network configures a value lower than or equal to 10 ms
zeroCorrelationZoneConfig N-CS configuration Transmission of CBRA/CFRA Through Another Cell Aspects presented herein enable the UE to convey a RACH Msg 1, whether for CBRA or CFRA, for an SSB/CSI-RS received through a first cell by transmitting the message via a second cell. Similarly, aspects presented herein enable the UE to convey a RACH Msg1 for an SSB/CSI-RS received through a first frequency band by transmitting the message through a second frequency band.

In one example aspect, while conveying RACH Msg1 configuration parameters to the UE, a network may also indicate a corresponding cell ID so that UE knows the cell to which the sets of SSBs/CSI-RS and the configured Msg1 parameters correspond.

As an example, CFRA-Resources in configuration information from a base station may include an indication of Cell ID, e.g., the ID of the cell whose SSB(s)/CSI-RS(s) are measured and selected by the UE for PRACH. The inclusion of the cell ID enables the UE to find the corresponding RACH parameters (e.g., time and frequency resources) for the particular cell on which the SSB/CSI-RS is received. A CFRA-SSB-Resource parameter may include an indication of a cell ID that identifies the cell whose SSB(s) are selected among by the UE for the RACH, e.g., to enable the UE to find the corresponding RACH preamble index. The CFRA-SSB-Resource parameter may indicate SSB(s) and corresponding preamble indices. Similarly, a CFRA-CSI-RS Resources parameter may include an indication of a cell ID that identifies the cell for which SSB/CSI-RS are measured and selected by the UE for the RACH, e.g., to enable the UE to find the corresponding RACH preamble index. The CFRA-CSI-RS-Resource parameter may indicate CSI-RS(s) and corresponding preamble indices. Thus, a RACH configuration may indicate CFRA resources by indicating a cell ID along with SSBs resources and/or CSI-RS resources for the cell that are selected to find correspond RACH parameters.

In a first example, all RACH resources may be configured in a particular cell, e.g., cell 0, which provides for UL transmission. In the above example for indicating cell ID, the network may indicate a cell ID to the UE along with SSB index/CSI-RS index and RACH occasion/preamble index in the RACH configuration. For example, the network can configure RACH occasion 1 and preamble index 1, that will occur in cell 0, to correspond to SSB1 of cell ID 1. The network can also configure RACH occasion 1 and preamble index 2 corresponding to SSB 1 of a different cell ID. Depending upon which cell's corresponding Msg1 the UE wants to transmit, the UE may select preamble 1 or preamble 2. Then, the UE sends the Msg1 with the selected preamble through cell 0. This enables the base station to determine the cell to which the RACH corresponds, e.g., based on the preamble that the UE uses to transmit the Msg 1.

Similar aspects may be applied for CBRA. For CBRA, the cell ID can be indicated along with a corresponding generic RACH configuration (e.g., rach-ConfigGeneric) that may indicate SSB(s) per RACH occasion and CBRA preambles per SSB for the indicated cell.

The cell ID may be indicated for the SSB/CSI-RS, while the RACH configuration index and the number of subcarrier regions may occur in a different cell. Thus, different RACH parameters may be provided corresponding to different cells. For example, a Msg 1 transmission in FR1 may correspond to 2 groups of cells, e.g., to UEs located in FR1 and to UEs located in FR2. The network may configured different RACH parameters corresponding to the different cells to make it clear to the base station which cell to which the RACH corresponds, even though the base station receives both RACHs on the same cell.

For example, a network may transmit up to 8 SSBs in a sub-6 frequency band and 64 SSBs in an over-6 frequency band. Hence, for sub-6 RACH, the network may configure RACH preambles and RACH occasions corresponding to up to 8 SSBs. For example, the 8 SSBs may be cyclically mapped to different RACH occasions and preamble indices in sub-6. On the other hand, 64 SSBs may be cyclically mapped to different RACH occasions and preamble indices in sub-6.

As presented herein, the network may configure two different RACH time-frequency regions in sub-6. The first one may be mapped from sub-6 SSBs. The second one may be mapped from over-6 SSBs, i.e. 64 over-6 GHz SSBs will be mapped to the RACH occasions and preamble indices in this second region.

In a general cell, all the RACH parameters, e.g., common RACH configuration parameters, dedicated RACH configuration parameters, and/or generic RACH configuration parameters, may vary depending on which combination of cells/frequency ranges that the network is using. For example, different configurations may be used depending on whether the network is configuring an SSB on FR1 to a RACH on FR1, or an SSB on FR2 to a RACH on FR1, or an SSB on FR1 to a RACH on FR2, etc. The network has the flexibility to configure different parameters and different mappings depending on the various possible combinations of cells/frequency ranges for the transmission of SSB/CSI-RS with a corresponding RACH on a different cell/frequency range.

Figure 5:
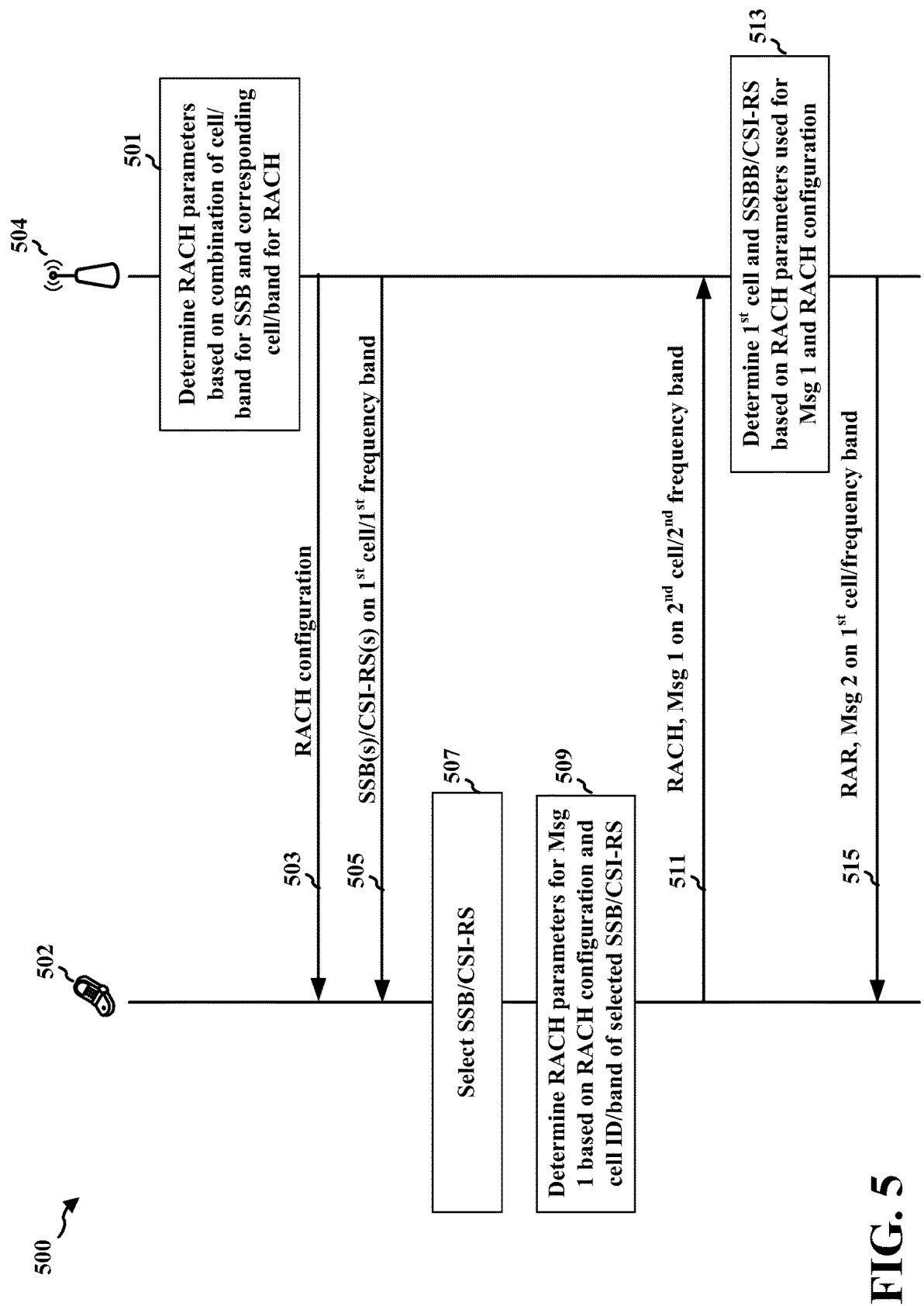
FIG. 5 illustrates an example of communication between a UE and a base station.

FIG. 5 illustrates an example of communication 500 between a UE 502 and a base station 504 in which the UE transmits a RACH on a different cell/frequency band than the cell/frequency band on which the UE receives an SSB/CSI-RS that prompts the RACH. At 501, the base station determines RACH parameters based on a combination of a first cell for SSB and a second cell for RACH corresponding to the SSB. Similarly, the base station may determine the RACH parameters based on a combination of a first frequency band for an SSB and a second frequency band for a RACH corresponding to the SSB. The base station may configure different RACH parameters for various combinations of SSB/RACH. The base station then configures 503 the UE 502 for RACH based on the parameters determined at 501. The base station may indicate a cell ID or a frequency range for the SSB to which the RACH parameters apply. As discussed supra, the cell ID in the RACH configuration may enable the UE to identify RACH parameters for an SSB received on a particular cell, whereas the RACH parameters may be applicable to a RACH transmitted through a different cell.

At 505, the UE receives SSB(s) or CSI-RS(s) on a first cell/first frequency band. At 507, the UE selects an SSB/CSI-RS for which the UE will transmit a RACH message, e.g., a RACH preamble or Msg 1. At 509, the UE uses the RACH configuration received from the base station to determine RACH parameters for the SSB/CSI-RS received on the $1^{st}$ cell/$1^{st}$ frequency range. The RACH parameters are for the transmission of a RACH on a different cell/different frequency range. The RACH parameters configured for the SSB(s)/CSI-RS(s) of the first cell may include any combination of the parameters described in Tables 1-7. For example, the first cell/first frequency range may correspond to a supplemental downlink operation that does not allow for uplink transmissions. In other examples, the cell/frequency range may not be reliable for uplink transmissions. In yet other examples, there may be other reasons that make the second cell/second frequency band more desirable for RACH. In one example, the first cell, on which the SSB/CSI-RS is received, may comprise a secondary cell, and the RACH may be transmitted on a primary secondary cell based on the SSB/CSI-RS. In another example, the SSB/CSI-RS may be received on a FR2 band, and the RACH may be transmitted on a FR1 band based on the SSB/CSI-RS The UE 502 transmits a Msg 1 511 for the selected SSB/CSI-RS that was received through the first cell/band, the Msg 1 being transmitted through the second cell/band. The Msg 1 is transmitted using the RACH parameters for the selected SSB/CSI-RS according to the RACH configuration received from the base station. The RACH parameters may include time/frequency resources for the RACH (e.g., RACH occasions), a RACH preamble index, etc. The RACH parameters configured for the selected SSB/CSI-RS of the first cell/band may include any combination of the parameters described in Tables 1-7.

The base station 504 receives the RACH message from the UE through the second cell/band. The base station determines the cell/band of the SSB/CSI-RS to which the RACH message pertains, e.g., the $1^{st}$ cell/$1^{st}$ band, based on the RACH parameters used to transmit the Msg 1. Thus, the base station can identify a different cell/band than the one on which the RACH was received by determining which RACH parameters were used to transmit the Msg 1 and comparing the RACH parameters to the RACH configuration provided to the UE at 503.

Once the base station determines, at 513, the SSB/CSI-RS selected by the UE, and the corresponding cell/band, the base station may proceed to transmit downlink communication to the UE on the $1^{st}$ cell/$1^{st}$ band. For example, the base station may respond to the RACH message at 511 by transmitting a Random Access Response (RAR) 515 using the $1^{st}$ cell and/or the $1^{st}$ band. The RAR 515 (e.g., Msg 2) may comprise a physical downlink control channel and/or physical downlink shared channel. The RAR may be transmitted through the first cell or using the first frequency band.

Figure 7:
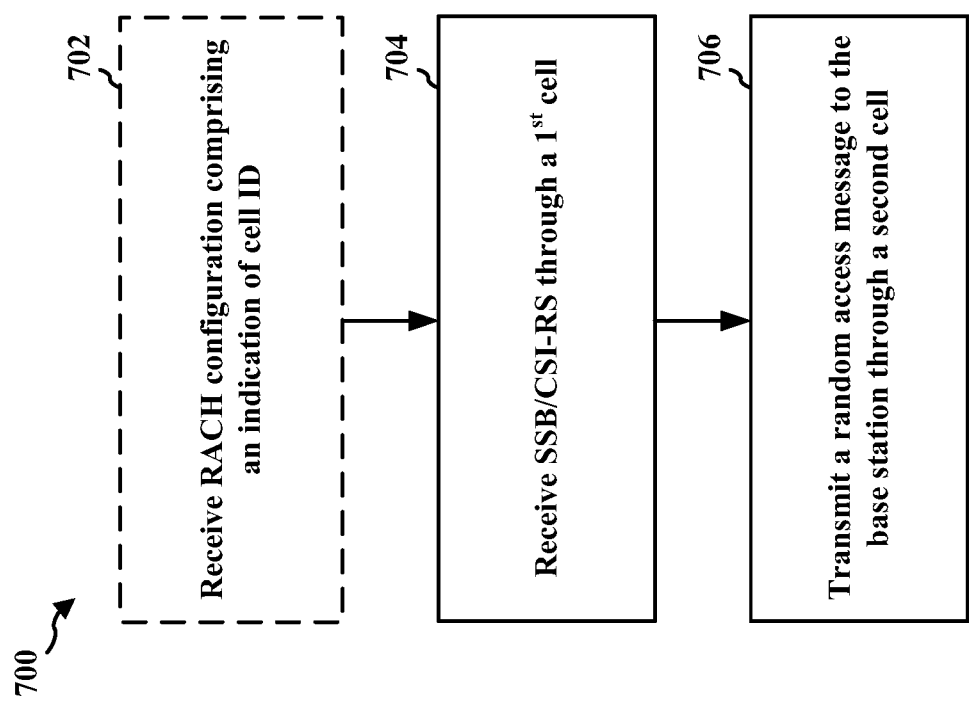
FIG. 7 is a flowchart of a method of wireless communication.

FIG. 7 is a flowchart 700 of a method of wireless communication. The method may be performed by a UE (e.g., UE 104, 350, 404, 502, the apparatus 902, 902'). The method enables a UE to generate a Physical Random Access Channel (PRACH) message based on an SSB/CSI-RS for a first cell and to transmit the PRACH message via another cell. The ability to transmit a PRACH message for the first cell via another cell may be important, e.g., when a UE is configured such that the UE can receive downlink communication on the first cell, but cannot transmit uplink communication via the first cell. A base station may still need to determine an SSB index to use to transmit the downlink communication to the UE via the first cell. Aspects enable a base station to select an SSB index for transmitting downlink communication to the UE via the first cell.

At 704, the UE receives an SSB and/or CSI-RS from a base station through a first cell, e.g., as illustrated at 505 in FIG. 5. The first cell may comprise a secondary cell, for example. At 706, the UE transmits a random access message to the base station through a second cell, e.g., as illustrated at 511 in FIG. 5. The second cell may comprise a primary secondary cell, for example. In another example, the second cell may comprise a primary cell. The random access message may comprise a RACH preamble, e.g., Msg 1, for the first cell that is transmitted to the base station using the second cell.

The UE may receive a RACH configuration from the base station, at 702, wherein the RACH configuration comprises an indication of a cell ID. Example aspects of a RACH configuration along with the indication of a cell ID are described in connection with 501 and 503 of FIG. 5. In the configuration, each SSB or CSI-RS may be mapped to one or more of different RACH time-frequency occasions and/or different preamble indices. Different RACH parameters may be provided to enable a base station to determine an SSB/CSI-RS and corresponding cell from the RACH message received through the different cell. The different RACH parameters may include any combination of the RACH parameters described in Tables 1-7.

Thus, the random access message, e.g., Msg 1, may be transmitted according to the RACH configuration received at 702 and using RACH parameters corresponding to the first cell on which the SSB or CSI-RS was received. The RACH may be contention based or contention free random access.

Figure 8:
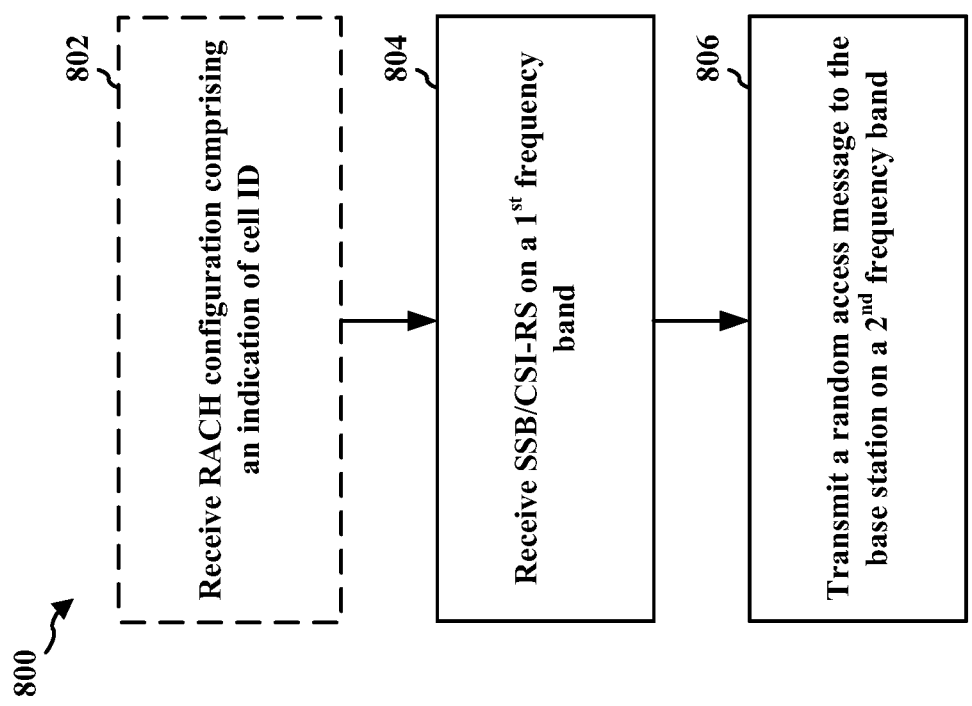
FIG. 8 is a flowchart of a method of wireless communication.

FIG. 8 is a flowchart 800 of a method of wireless communication. The method may be performed by a UE (e.g., UE 104, 350, 404, 502, the apparatus 902, 902'). The method of FIG. 8 is similar to the method of FIG. 7, except for the use of different frequency bands rather than different cells. The method enables a UE to generate a Physical Random Access Channel (PRACH) message based on an SSB/CSI-RS received on a first band and to transmit the PRACH message via another band. The ability to transmit a PRACH message for the first band via another band may be important, e.g., when a UE is configured such that the UE can receive downlink communication on the first band, but cannot transmit uplink communication on the first band. A base station may still need to determine an SSB index to use to transmit the downlink communication to the UE on the first band. Aspects enable a base station to select an SSB index for transmitting downlink communication to the UE on the first band.

At 804, the UE receives an SSB and/or CSI-RS from a base station on a first frequency band, e.g., as illustrated at 503 in FIG. 5. The first frequency band may comprise an FR2 band over 6 GHz, for example. The first frequency band may have requirements that place limits on uplink transmission.

At 806, the UE transmits a random access message to the base station on a second frequency band, e.g., as illustrated at 511 in FIG. 5. The second frequency band may comprise an FR1 band under 6 GHz, for example. The random access message may comprise a RACH preamble, e.g., Msg 1, for the first frequency band that is transmitted to the base station using the second frequency band.

The UE may receive a RACH configuration from the base station, at 802, wherein the RACH configuration comprises an indication of a cell ID. Example aspects of a RACH configuration along with the indication of a cell ID are described in connection with 501 and 503 of FIG. 5. In the configuration, each SSB or CSI-RS may be mapped to one or more of different RACH time-frequency occasions and/or different preamble indices. Different RACH parameters may be provided to enable a base station to determine an SSB/CSI-RS and corresponding frequency band from the RACH message received through the different frequency band. The different RACH parameters may include any combination of the RACH parameters described in Tables 1-7.

Thus, the random access message, e.g., Msg 1, may be transmitted according to the RACH configuration received at 802 and using RACH parameters corresponding to the first frequency band on which the SSB or CSI-RS was received. The RACH may be contention based or contention free random access.

Figure 9:
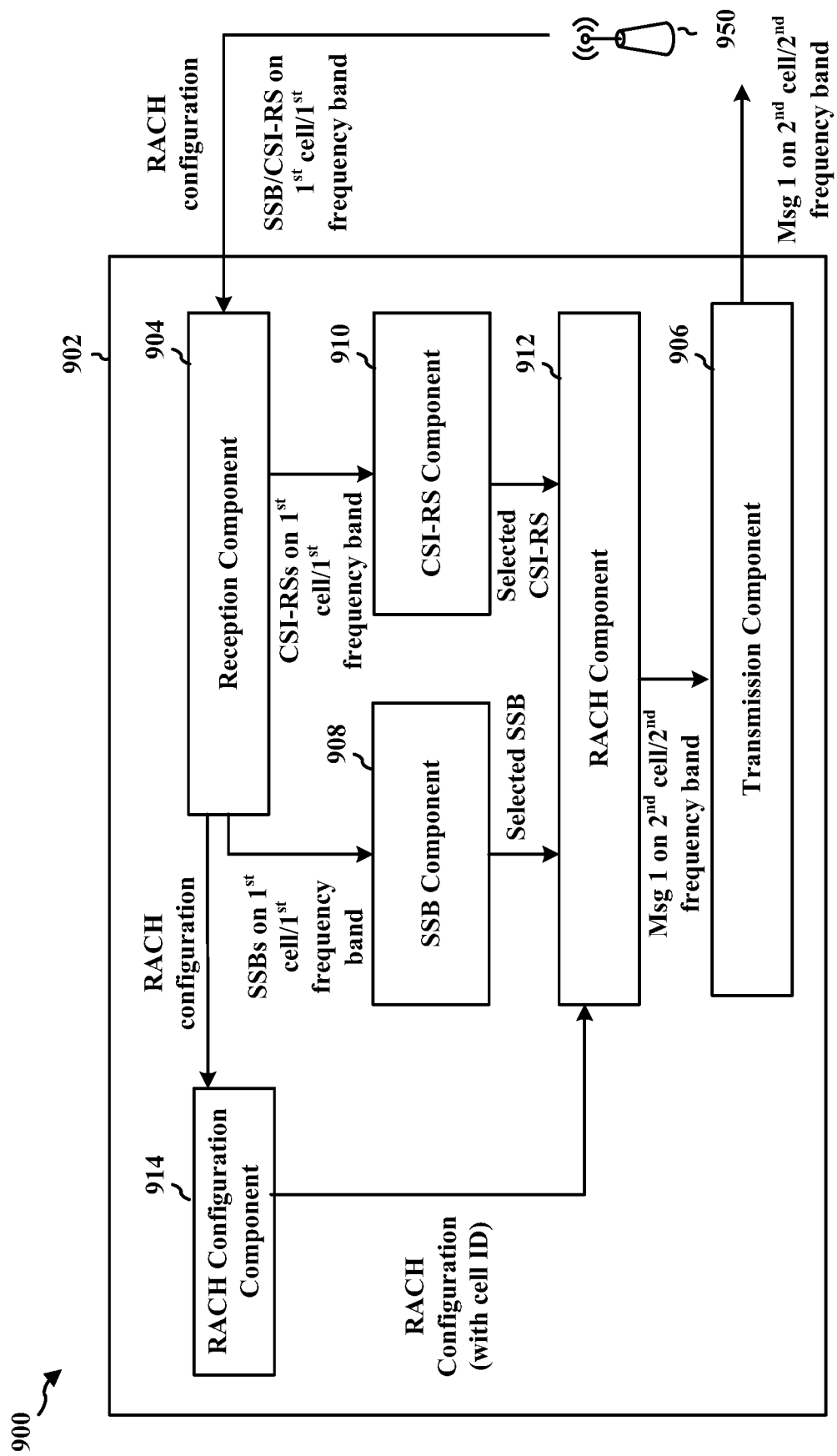
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE (e.g., UE 104, 350, 404, 502) in wireless communication with base station 950. The apparatus includes a reception component 904 that receives downlink communication from the base station 950 and a transmission component 906 that transmits uplink communication to the base station 950. The apparatus includes an SSB component 908 configured to receive SSBs through a first cell/first frequency range and a CSI-RS component 910 configured to receive CSI-RSs through a first cell/first frequency range. The apparatus includes a RACH component 912 configured to transmit a random access message to the base station in response to the SSB/CSI-RS, wherein the random access message is transmitted through a second cell. The apparatus may also include a RACH configuration component 914 configured to receive a RACH configuration from the base station, wherein the RACH configuration comprises an indication of a cell identifier ID.

The apparatus may include additional components that perform each of the blocks of the algorithm in the aforementioned flowcharts of FIGS. 5, 6, and 7. As such, each block in the aforementioned flowcharts of FIGS. 5, 6, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
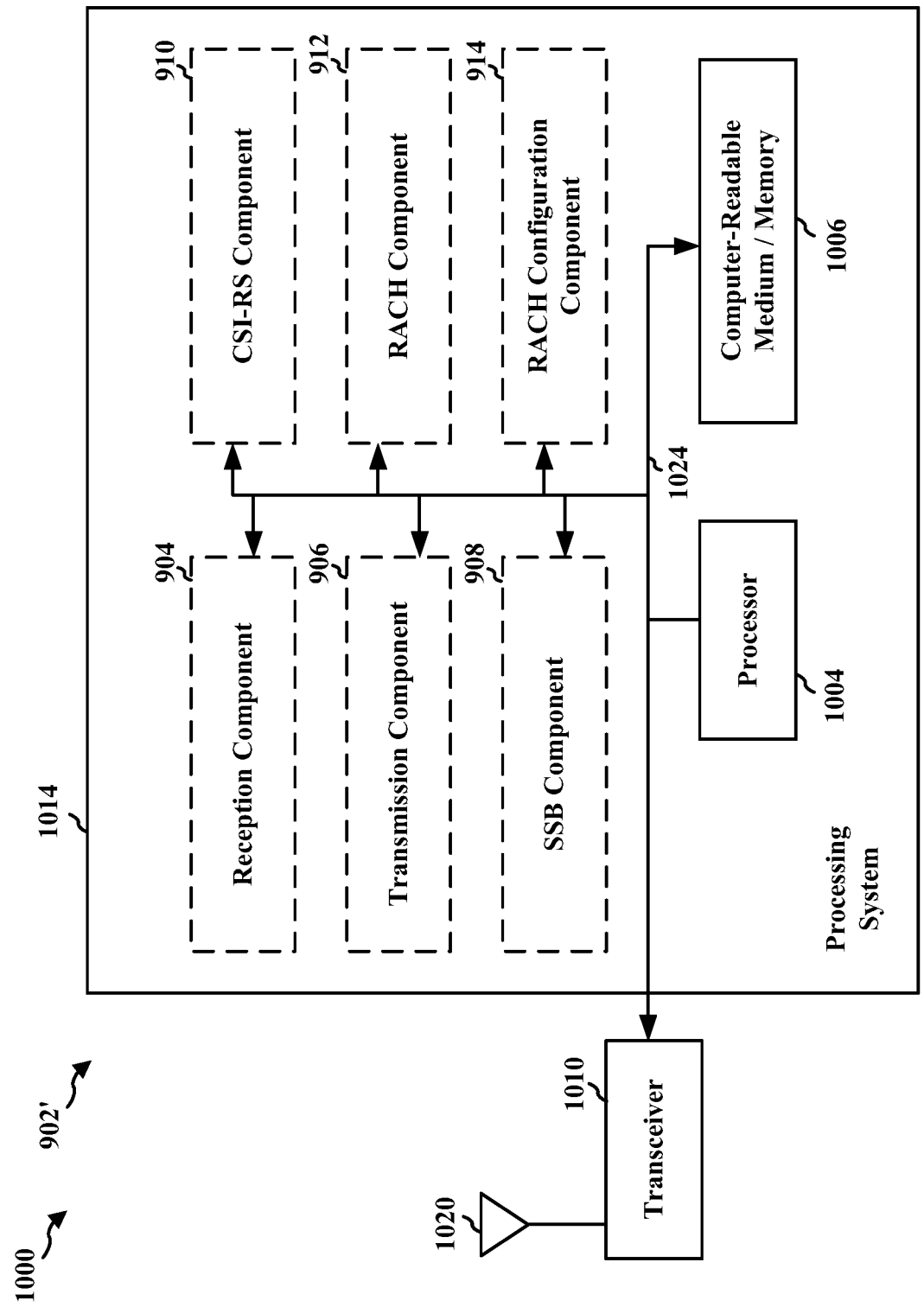
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for receiving at least one of a Synchronization Signal Block (SSB) or a Channel State Information Reference Signal (CSI-RS) from a base station through a first cell, means for transmitting a random access message to the base station through a second cell, means for receiving a Random Access Channel (RACH) configuration from the base station, wherein the RACH configuration comprises an indication of a cell identifier (ID), means for receiving at least one of a Synchronization Signal Block (SSB) or a Channel State Information Reference Signal (CSI-RS) from a base station on a first frequency band, and means for transmitting a random access message to the base station on a second frequency band. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
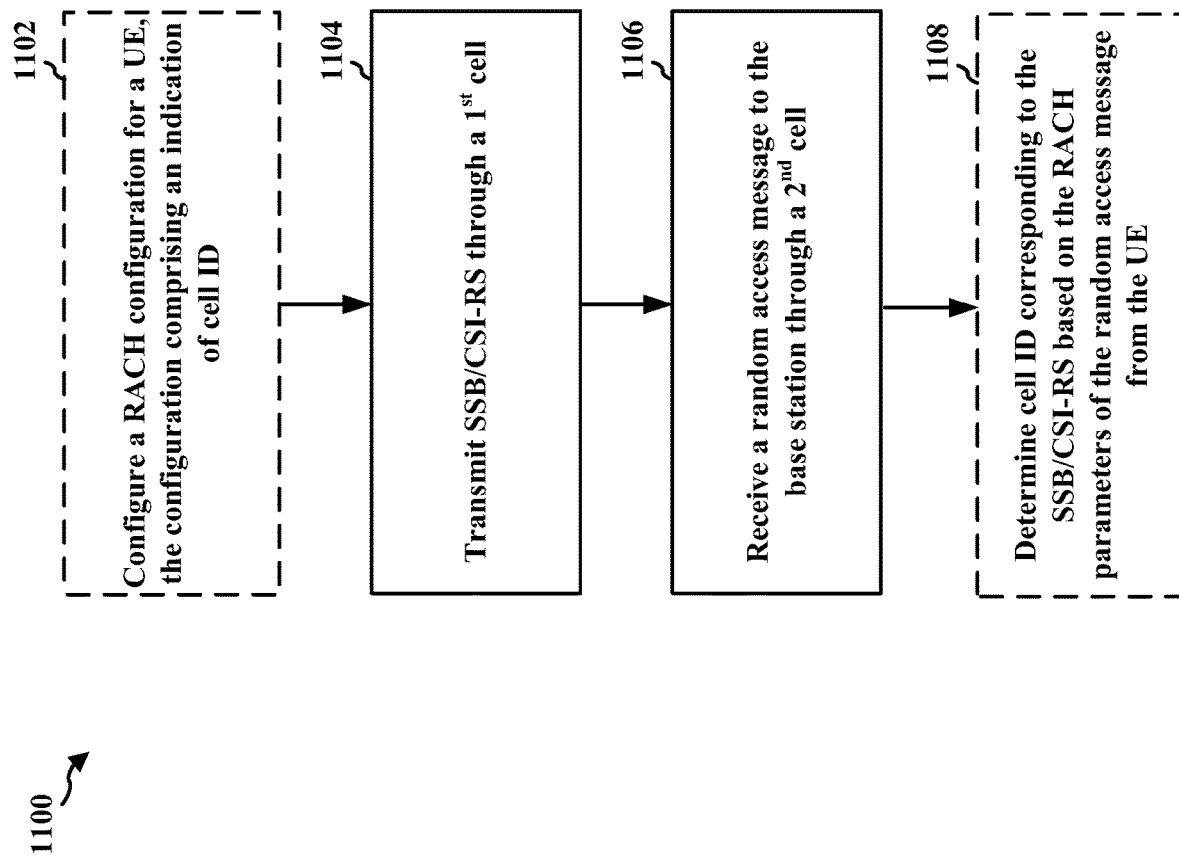
FIG. 11 is a flowchart of a method of wireless communication.

FIG. 11 is a flowchart 1100 of a method of wireless communication. The method may be performed by a base station (e.g., base station 102, 180, 310, 402, 504, 950, the apparatus 1302, 1302'). Optional aspects are indicated with a dashed line. Aspects of the method enable a base station to select an SSB index for transmitting downlink communication to the UE via a first cell based on a Physical Random Access Channel (PRACH) message that is based on an SSB/CSI-RS for a first cell yet is received via another cell. The ability to receive a PRACH message for the first cell via another cell may be important, e.g., when a UE is configured such that the UE can receive downlink communication on the first cell, but cannot transmit uplink communication via the first cell. A base station may still need to determine an SSB index to use to transmit the downlink communication to the UE via the first cell. Aspects enable a base station to select an SSB index for transmitting downlink communication to the UE via the first cell.

At 1104, the base station transmits at least one of an SSB or a CSI-RS through a first cell. FIG. 5 illustrates an example SSB/CSI-RS 503 transmitted from base station 504 to UE 502. The UE may use the SSB/CSI-RS to generate a RACH preamble.

At 1106, the base station receives a random access message from a UE through a second cell, e.g., as illustrated at 511 in FIG. 5. Thus, the random access message may comprise a RACH preamble, e.g., Msg 1, for the first cell that is received from the UE through the second cell. In an example, the first cell may comprise a secondary cell. The second cell may comprise a primary secondary cell. In another example, the second cell may comprise a primary cell.

As illustrated at 1102, prior to transmitting the SSB/CSI-RS, the base station may configure a RACH configuration for the UE, wherein the RACH configuration comprises an indication of a cell ID. The RACH may be contention based or contention free random access.

Then, the random access message may be received from the UE at 1106 according to the RACH configuration using RACH parameters corresponding to the first cell on which the SSB or CSI-RS was received. Example aspects of a RACH configuration along with the indication of a cell ID are described in connection with 501 and 503 of FIG. 5. In the configuration, each SSB or CSI-RS may be mapped to one or more of different RACH time-frequency occasions and/or different preamble indices. Different RACH parameters may be provided to enable a base station to determine an SSB/CSI-RS and corresponding 1$^{st}$ cell from the RACH message received through the second cell. The different RACH parameters may include any combination of the RACH parameters described in Tables 1-7.

At 1108, the base station may determine the cell ID corresponding to the SSB or the CSI-RS based on the RACH parameters of the random access message received from the UE. As described in connection with 513 in FIG. 5, the base station may identify the cell for the RACH based on the RACH parameters used by the UE to transmit the random access message and the RACH configuration provided to the UE.

Figure 12:
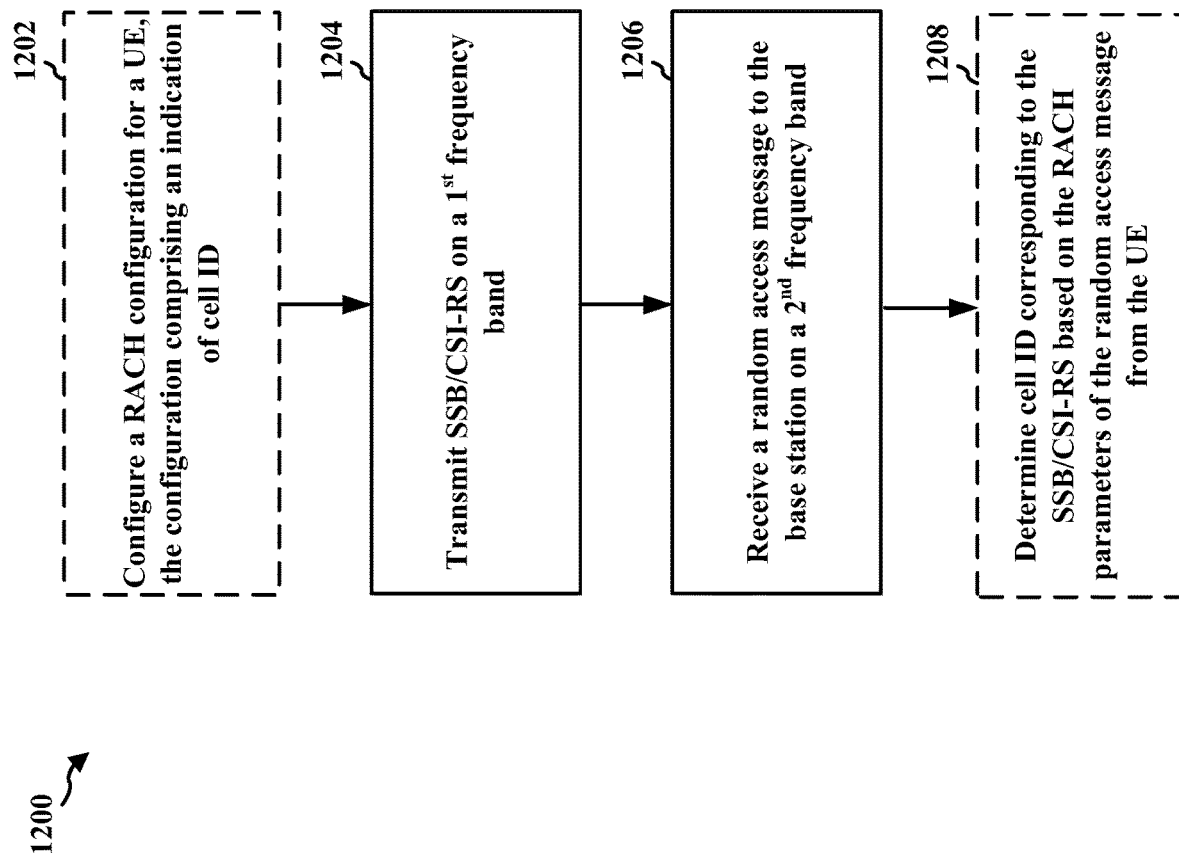
FIG. 12 is a flowchart of a method of wireless communication.

FIG. 12 is a flowchart 1200 of a method of wireless communication. The method may be performed by a base station (e.g., base station 102, 180, 310, 402, 504, 950, the apparatus 1302, 1302'). Optional aspects are indicated with a dashed line. Aspects of the method enable a base station to select an SSB index for transmitting downlink communication to the UE via a first band based on a Physical Random Access Channel (PRACH) message that is based on an SSB/CSI-RS for a first band and yet is received via another band. The ability to receive a PRACH message for the first band via another band may be important, e.g., when a UE is configured such that the UE can receive downlink communication on the first band, but cannot transmit uplink communication via the first band. A base station may still need to determine an SSB index to use to transmit the downlink communication to the UE via the first band. Aspects enable a base station to select an SSB index for transmitting downlink communication to the UE via the first band.

At 1204, the base station transmits at least one of an SSB or a CSI-RS on a first frequency band. FIG. 5 illustrates an example SSB/CSI-RS 503 transmitted from base station 504 to UE 502. The UE may use the SSB/CSI-RS to generate a RACH preamble.

At 1206, the base station receives a random access message from a UE on a second frequency band, e.g., as illustrated at 511 in FIG. 5. Thus, the random access message may comprise a RACH preamble, e.g., Msg 1, for the first frequency band that is received from the UE on the second frequency band. In an example, the first frequency range may comprise a Frequency Range 2 (FR2) band over 6 GHz, and the second frequency band may comprise a Frequency Range 1 (FR1) band under 6 GHz.

As illustrated at 1202, prior to transmitting the SSB/CSI-RS, the base station may configure a RACH configuration for the UE, wherein the RACH configuration comprises an indication of a cell ID. The RACH may be contention based or contention free random access.

Then, the random access message may be received from the UE at 1206 according to the RACH configuration using RACH parameters corresponding to the first frequency band on which the SSB or CSI-RS was received. Example aspects of a RACH configuration along with the indication of a cell ID are described in connection with 501 and 503 of FIG. 5. In the configuration, each SSB or CSI-RS may be mapped to one or more of different RACH time-frequency occasions and/or different preamble indices. Different RACH parameters may be provided to enable a base station to determine an SSB/CSI-RS and corresponding first frequency band from the RACH message received on the second frequency band. The different RACH parameters may include any combination of the RACH parameters described in Tables 1-7.

At 1208, the base station may determine the cell ID corresponding to the SSB or the CSI-RS based on the RACH parameters of the random access message received from the UE. As described in connection with 513 in FIG. 5, the base station may identify the first frequency band for the RACH based on the RACH parameters used by the UE to transmit the random access message and the RACH configuration provided to the UE.

Figure 13:
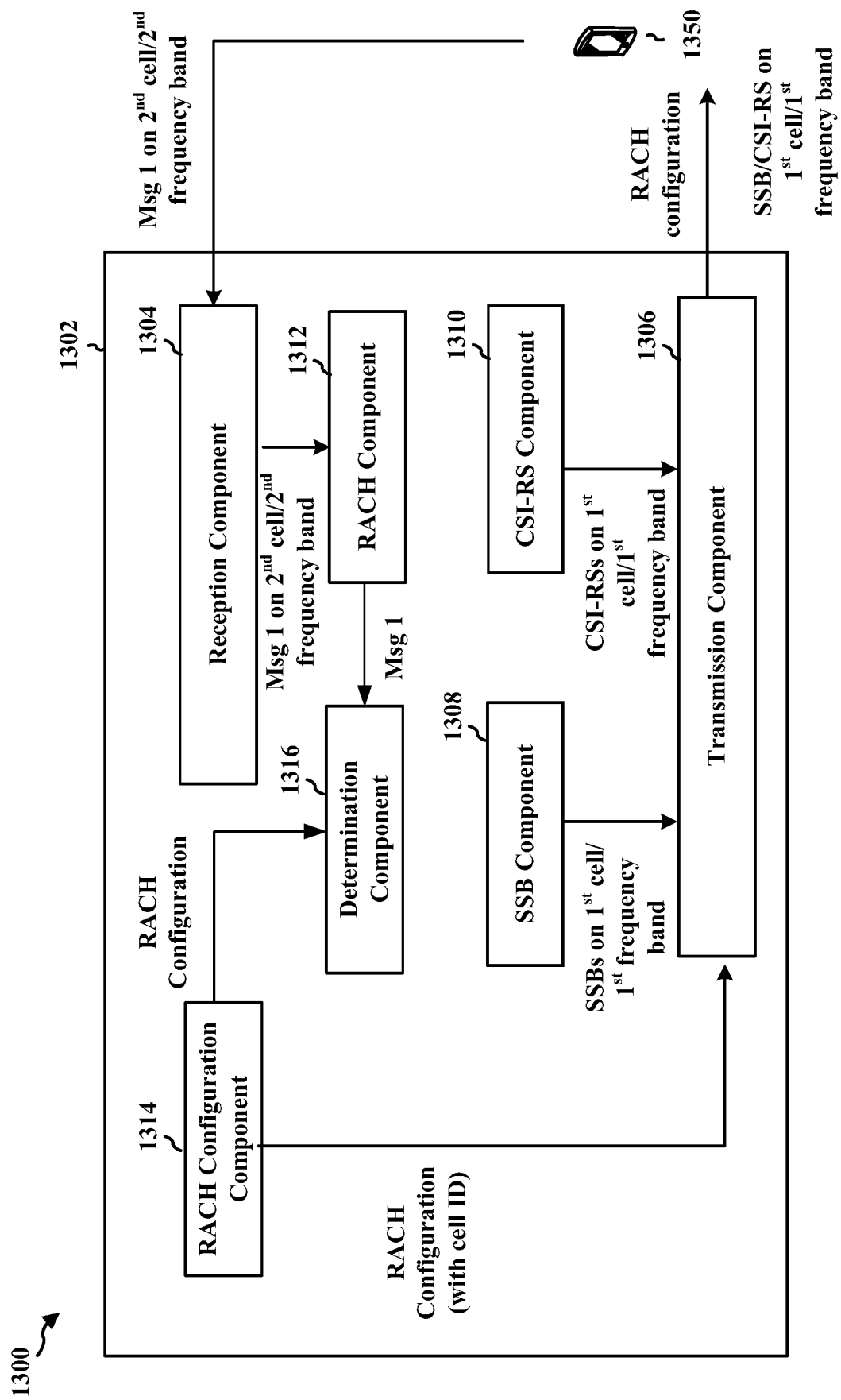
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a base station (e.g., base station 102, 180, 310, 402, 504, 950). The apparatus includes a reception component 1304 that receive uplink communication from UE 1350 and a transmission component 1306 that transmits downlink communication to the UE 1350. The apparatus may include an SSB component 1308 configured to transmit an SSB through a first cell or on a first frequency band and a CSI-RS component 1310 configured to transmit a CSI-RS through a first cell or on a first frequency band. The apparatus may include a RACH component 1312 configured to receiving a random access message from a UE through a second cell or on a second frequency band, as described in connection with FIGS. 5, 11, and 12. The apparatus may include a RACH configuration component 1314 configured to configure a RACH configuration for the UE, wherein the RACH configuration comprises an indication of a cell ID, e.g., as described in connection with 1102, 1202. The apparatus may include a determination component configured to determine the cell ID corresponding to the SSB or the CSI-RS based on the RACH parameters of the random access message received from the UE, as described in connection with 1108, 1208.

The apparatus may include additional components that perform each of the blocks of the algorithm in the aforementioned flowcharts of FIGS. 5, 11, and 12. As such, each block in the aforementioned flowcharts of FIGS. 5, 11, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
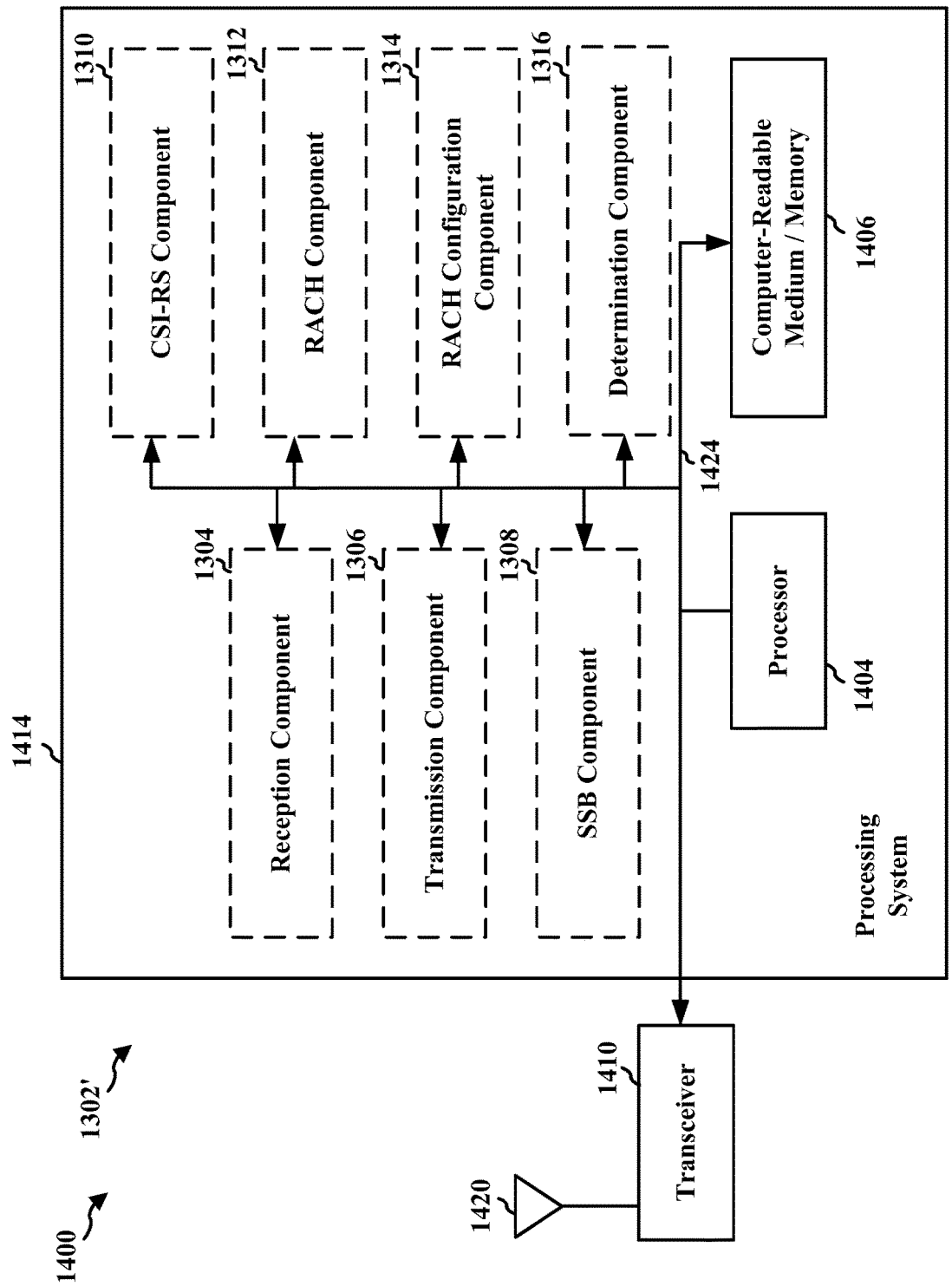
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375.

In one configuration, the apparatus 1302/1302' for wireless communication includes means for transmitting at least one of a Synchronization Signal Block (SSB) or a Channel State Information Reference Signal (CSI-RS) on a first frequency band, means for receiving a random access message from a User Equipment (UE) on a second frequency band, means for configuring a Random Access Channel (RACH) configuration for the UE, wherein the RACH configuration comprises an indication of a cell identifier (ID), means for determining the cell ID corresponding to the SSB or the CSI-RS based on the RACH parameters of the random access message received from the UE. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
receiving at least one of a Synchronization Signal Block (SSB) or a Channel State Information Reference Signal (CSI-RS) from a base station through a first cell, the first cell having an uplink transmission limitation that restricts transmit power in uplink signaling between the UE and the base station; and
transmitting, to the base station through a second cell, a random access message corresponding to one of the at least one of the SSB or the CSI-RS, using one or more Random Access Channel (RACH) parameters corresponding to the first cell that enables the base station to transmit downlink signaling to the UE via the first cell having the uplink transmission limitation.

2. The method of claim 1, wherein the first cell comprises a secondary cell.

3. The method of claim 1, wherein the second cell comprises a primary secondary cell.

4. The method of claim 1, wherein the second cell comprises a primary cell.

5. The method of claim 1, wherein the random access message comprises a Random Access Channel (RACH) preamble for the first cell that is transmitted to the base station using the second cell.

6. The method of claim 1, further comprising:
receiving a Random Access Channel (RACH) configuration from the base station, wherein the RACH configuration comprises an indication of a cell identifier (ID).

7. The method of claim 6, wherein the random access message is transmitted according to the RACH configuration using the RACH parameters corresponding to the first cell on which the at least one of the SSB or the CSI-RS is received.

8. The method of claim 1, wherein each SSB or CSI-RS of the at least one of the SSB or the CSI-RS is mapped to one or more of:
different Random Access Channel (RACH) time-frequency occasions, or
different preamble indices, and
wherein the random access message indicates a time-frequency occasion based on one of the different RACH time-frequency occasions and an index based on one of the different preamble indices that correspond to the one of the at least one of the SSB or the CSI-RS.

9. The method of claim 1, where the random access message is associated with one of a contention based random access procedure or a contention free random access procedure.

10. An apparatus for wireless communication at a User Equipment (UE), comprising:
a memory; and
at least one processor coupled to the memory and configured to:
receive at least one of a Synchronization Signal Block (SSB) or a Channel State Information Reference Signal (CSI-RS) from a base station through a first cell with an uplink transmission limitation that restricts transmit power in uplink signaling between the UE and the base station; and
transmit, to the base station through a second cell, a random access message corresponding to one of the at least one of the SSB or the CSI-RS, using one or more Random Access Channel (RACH) parameters corresponding to the first cell that enables the base station to transmit downlink signaling to the UE via the first cell having the uplink transmission limitation.

11. The apparatus of claim 10, wherein the at least one processor is further configured to:
receive a Random Access Channel (RACH) configuration from the base station, wherein the RACH configuration comprises an indication of a cell identifier (ID).

12. A method of wireless communication at a User Equipment (UE), comprising:
receiving at least one of a Synchronization Signal Block (SSB) or a Channel State Information Reference Signal (CSI-RS) from a base station on a first frequency band with an uplink transmission limitation that restricts transmit power in uplink signaling between the UE and the base station; and
transmitting, to the base station on a second frequency band, a random access message corresponding to one of the at least one of the SSB or the CSI-RS, using one or more Random Access Channel (RACH) parameters corresponding to the first frequency band that enables the base station to transmit downlink signaling to the UE via the first frequency band with the uplink transmission limitation.

13. The method of claim 12, wherein the first frequency band comprises a Frequency Range 2 (FR2) band occupying frequencies less than 6 GHz.

14. The method of claim 13, wherein the second frequency band comprises a Frequency Range 1 (FR1) band occupying frequencies less than 6 GHz.

15. The method of claim 12, wherein the random access message comprises a Random Access Channel (RACH) preamble for the first frequency band that is transmitted to the base station using the second frequency band.

16. The method of claim 12, further comprising:
receiving a Random Access Channel (RACH) configuration from the base station, wherein the RACH configuration comprises an indication of a cell identifier (ID).

17. The method of claim 16, wherein the random access message is transmitted according to the RACH configuration using the RACH parameters corresponding to the first frequency band on which the at least one of the SSB or CSI-RS is received.

18. The method of claim 12, wherein each SSB or CSI-RS of the at least one of the SSB or the CSI-RS is mapped to one or more of:
different Random Access Channel (RACH) time-frequency occasions, or
different preamble indices, and
wherein the random access message indicates a time-frequency occasion based on one of the different RACH time-frequency occasions and an index based on one of the different preamble indices that correspond to the one of the at least one of the SSB or the CSI-RS.

19. The method of claim 12, where the random access message is associated with a contention based random access procedure or a contention free random access procedure.

20. An apparatus for wireless communication at a User Equipment (UE), comprising:
a memory; and
at least one processor coupled to the memory and configured to:
receive at least one of a Synchronization Signal Block (SSB) or a Channel State Information Reference Signal (CSI-RS) from a base station on a first frequency band having an uplink transmission limitation that restricts transmit power in uplink signaling between the UE and the base station; and transmit, to the base station on a second frequency band, a random access message corresponding to one of the at least one of the SSB or the CSI-RS, using one or more Random Access (RACH) parameters corresponding the first frequency band that enables the base station to transmit downlink signaling to the UE via the first frequency band having the uplink transmission limitation.

21. The apparatus of claim 20, wherein the at least one processor is further configured to:

receive a Random Access Channel (RACH) configuration from the base station, wherein the RACH configuration comprises an indication of a cell identifier (ID).

22. A method of wireless communication at a base station, comprising:

transmitting at least one of a Synchronization Signal Block (SSB) or a Channel State Information Reference Signal (CSI-RS) through a first cell with an uplink transmission limitation that restricts transmit power in uplink signaling between a User Equipment (UE) and the base station; and receiving, from the UE through a second cell, a random access message corresponding to one of the at least one of the SSB or the CSI-RS, wherein the random access message indicates an index corresponding to the first cell that enables the base station to transmit downlink signaling to the UE via the first cell with the uplink transmission limitation.

23. The method of claim 22, further comprising:

configuring a Random Access Channel (RACH) configuration for the UE, wherein the RACH configuration comprises an indication of a cell identifier (ID).

24. The method of claim 23, wherein the random access message is received from the UE according to the RACH configuration using RACH parameters corresponding to the first cell on which the at least one of the SSB or the CSI-RS is transmitted.

25. The method of claim 24, further comprising:

determining the cell ID corresponding to the at least one of the SSB or the CSI-RS based on the RACH parameters of the random access message received from the UE.

26. The method of claim 22, wherein the first cell comprises a secondary cell.

27. The method of claim 22, wherein the second cell comprises a primary secondary cell.

28. The method of claim 22, wherein the second cell comprises a primary cell.

29. The method of claim 22, wherein the random access message comprises a Random Access Channel (RACH) preamble for the first cell that is received from the UE through the second cell.

30. The method of claim 22, wherein each SSB or CSI-RS of the at least one of the SSB or the CSI-RS is mapped to one or more of:

different Random Access Channel (RACH) time-frequency occasions, or different preamble indices, and wherein the random access message indicates a time-frequency occasion based on one of the different RACH time-frequency occasions and the index based on one of the different preamble indices that correspond to the one of the at least one of the SSB or the CSI-RS.

31. The method of claim 22, where the random access message is associated with a contention based random access procedure or a contention free random access procedure.

32. An apparatus for wireless communication at a base station, comprising:

a memory; and at least one processor coupled to the memory and configured to:

transmit at least one of a Synchronization Signal Block (SSB) or a Channel State Information Reference Signal (CSI-RS) through a first cell with an uplink transmission limitation that restricts transmit power in uplink signaling between a User Equipment (UE) and the base station; and receive, from the UE through a second cell, a random access message corresponding to one of the at least one of the SSB or the CSI-RS, wherein the random access message indicates an index corresponding to the first cell that enables the base station to transmit downlink signaling to the UE via the first cell with the uplink transmission limitation.

33. The apparatus of claim 32, wherein the at least one processor is further configured to:

configure a Random Access Channel (RACH) configuration for the UE, wherein the RACH configuration comprises an indication of a cell identifier (ID).

34. The apparatus of claim 33, wherein the random access message is received from the UE according to the RACH configuration using RACH parameters corresponding to the first cell on which the at least one of the SSB or the CSI-RS is transmitted, and wherein the at least one processor is further configured to:

determine the cell ID corresponding to the at least one of the SSB or the CSI-RS based on the RACH parameters of the random access message received from the UE.

35. A method of wireless communication at a base station, comprising:

transmitting at least one of a Synchronization Signal Block (SSB) or a Channel State Information Reference Signal (CSI-RS) on a first frequency band with an uplink transmission limitation that restricts transmit power in uplink signaling between a User Equipment (UE) and the base station; and receiving, from the UE on a second frequency band, a random access message corresponding to one of the at least one of the SSB or the CSI-RS, wherein the random access message indicates an index corresponding to the first frequency band that enables the base station to transmit downlink signaling to the UE via the first frequency band with the uplink transmission limitation.

36. The method of claim 35, further comprising:

configuring a Random Access Channel (RACH) configuration for the UE, wherein the RACH configuration comprises an indication of a cell identifier (ID).

37. The method of claim 36, wherein the random access message is received from the UE according to the RACH configuration using RACH parameters corresponding to the first frequency band on which the at least one of the SSB or CSI-RS is transmitted.

38. The method of claim 37, further comprising:

determining the cell ID corresponding to the at least one of the SSB or the CSI-RS based on the RACH parameters of the random access message received from the UE.

39. The method of claim 35, wherein the first frequency band comprises a Frequency Range 2 (FR2) band occupying frequencies greater than 6 GHz.

40. The method of claim 39, wherein the second frequency band comprises a Frequency Range 1 (FR1) band occupying frequencies less than 6 GHz.

41. The method of claim 35, wherein the random access message comprises a Random Access Channel (RACH) preamble for the first frequency band that is received from the UE on the second frequency band.

42. The method of claim 35, wherein each SSB or CSI-RS of the at least one of the SSB or the CSI-RS is mapped to one or more of:
different RACH time-frequency occasions, or
different preamble indices, and
wherein the random access message indicates a time-frequency occasion based on one of the different RACH time-frequency occasions and the index based on one of the different preamble indices that correspond to the one of the at least one of the SSB or the CSI-RS.

43. The method of claim 35, where the random access message is associated with a contention based random access procedure or a contention free random access procedure.

44. An apparatus for wireless communication at a base station, comprising:
a memory; and
at least one processor coupled to the memory and configured to:
transmit at least one of a Synchronization Signal Block (SSB) or a Channel State Information Reference Signal (CSI-RS) on a first frequency band with an uplink transmission limitation that restricts transmit power in uplink signaling between a User Equipment (UE) and the base station; and
receive, from the UE on a second frequency band, a random access message corresponding to one of the at least one of the SSB or the CSI-RS, wherein the random access message indicates an index corresponding to the first frequency band that enables the base station to transmit downlink signaling to the UE via the first frequency band with the uplink transmission limitation.

45. The apparatus of claim 44, wherein the at least one processor is further configured to:
configure a Random Access Channel (RACH) configuration for the UE, wherein the RACH configuration comprises an indication of a cell identifier (ID).

46. The apparatus of claim 45, wherein the random access message is received from the UE according to the RACH configuration using RACH parameters corresponding to the first frequency band on which the at least one of the SSB or CSI-RS is transmitted, and wherein the at least one processor is further configured to:
determine the cell ID corresponding to the at least one of the SSB or the CSI-RS based on the RACH parameters of the random access message received from the UE.

* * * * *